United States Patent [19]
Shiflett

[11] Patent Number: 5,236,611
[45] Date of Patent: Aug. 17, 1993

[54] MIXTURES OF PERFLUOROPROPANE AND TRIFLUOROETHANE

[75] Inventor: Mark B. Shiflett, Newark, Del.

[73] Assignee: E. I. Du Pont de Nemours and Company, Wilmington, Del.

[21] Appl. No.: 783,186

[22] Filed: Oct. 28, 1991

[51] Int. Cl.$^5$ .......................... C09K 5/04; C09K 3/30; A62D 1/08; C08J 9/14
[52] U.S. Cl. .................................. 252/67; 62/114; 252/2; 252/8; 252/162; 252/172; 252/305; 252/364; 252/511; 252/DIG. 9; 264/53; 264/DIG. 5; 521/98; 521/131
[58] Field of Search ............... 252/67, 162, 172, 305, 252/364, DIG. 9, 2, 8, 571; 62/114; 264/53, DIG. 5; 521/98, 131

[56] References Cited

U.S. PATENT DOCUMENTS

| | | | |
|---|---|---|---|
| 4,085,518 | 4/1978 | Jackson et al. | 34/37 |
| 4,482,465 | 11/1984 | Gray | 252/67 |
| 4,810,403 | 3/1989 | Bivens et al. | 252/67 |
| 5,114,986 | 5/1992 | Lin | 252/67 |

FOREIGN PATENT DOCUMENTS

| | | | |
|---|---|---|---|
| 2028735 | 5/1991 | Canada . | |
| 460992 | 12/1991 | European Pat. Off. . | |
| 3093889 | 4/1991 | Japan . | |
| 1362739 | 12/1987 | U.S.S.R. | 252/67 |

*Primary Examiner*—Linda Skaling
*Attorney, Agent, or Firm*—P. Michael Walker

[57] ABSTRACT

Constant boiling compositions of perfluoropropane and trifluoroethane that are useful as refrigerants, aerosol propellants, heat transfer media, gaseous dielectrics, fire extinguishing agents, expansion agents for polyolefins and polyurethanes and as power cycle working fluids.

9 Claims, No Drawings

MIXTURES OF PERFLUOROPROPANE AND TRIFLUOROETHANE

BACKGROUND OF THE INVENTION

This invention relates to mixtures containing fluorinated hydrocarbons and, more specifically, to constant boiling compositions that are mixtures of perfluoropropane and trifluoroethane.

Recently the long-term environmental effects of chlorofluorocarbons have come under substantial scientific scrutiny, because if has been postulated that these materials decompose in the stratosphere, under the influence of ultraviolet radiation to release chlorine atoms. Chlorine atoms are theorized to undergo chemical reaction in the stratosphere, which could deplete the stratospheric ozone layer, which shields the earth from harmful ultraviolet radiation. A substantial reduction of stratospheric ozone could have a serious deleterious impact on the quality of life on earth.

There is a continuing need in this art for new materials having new combinations of properties that do not contain substantial amounts of chlorine atoms for use as refrigerants, aerosol propellants, heat transfer media, gaseous dielectrics, fire extinguishing agents, expansion agents for polyolefins and polyurethanes and as power cycle working fluids. Such compositions should be potentially environmentally safe substitutes for chlorofluorocarbons that are used as refrigerants, aerosol propellants, etc.

In view of the potential environmental problem associated with stratospheric ozone depletion, there is an urgent need for new materials possessing properties which make them useful in the aforementioned applications and which are also potentially environmentally safe.

There is a limit to the number of single fluorinated hydrocarbon substances which can be candidates as environmentally safe materials. Mixtures of known fluorinated hydrocarbons, however, might be used if the desired combination of properties could be found in a given mixture. Simple mixtures, however, create problems in design and operation of refrigeration and other equipment because of component segregation in both the vapor and liquid phases. To avoid component segregation problem s, it is particularly desirable to discover new substantially constant boiling fluorocarbon blends. Such blends should not suffer from component segregation problems. Unfortunately, it is not possible to predict the formation of constant boiling compositions, thus complicating the search for novel constant boiling compositions which possess the desired combination of properties. There is a need for substantially constant boiling compositions that have properties which make them particularly useful as refrigerants, aerosol propellants, heat transfer media, gaseous dielectrics, fire extinguishing agents, expansion agents for polyolefins and polyurethanes and as power cycle working fluids and that are potentially environmentally safe.

SUMMARY OF THE INVENTION

The present invention is directed to substantially constant boiling compositions comprising 1-65 weight percent, preferably 43-58 weight percent, perfluoropropane, and 35-99 weight percent, preferably 42-57 weight percent, 1,1,1-trifluoroethane. The preferred compositions of the invention are the constant boiling compositions comprising 46-54 weight percent perfluoropropane and 46-54 weight percent 1,1,1-trifluoroethane. An especially preferred constant boiling composition comprises about 47.4 weight percent perfluoropropane ($CF_3CF_2CF_3$, boiling point $= -36.5°$ C.) and about 52.6 weight percent 1,1,1-trifluoroethane ($CF_3CH_3$, boiling point $= -47.6°$ C.), boiling at $-49.7°$ C. at 760 torr, about atmospheric pressure.

The novel compositions of the present invention exhibit a higher vapor pressure than either of its two fluorocarbon constituents. Substantially constant boiling compositions of the present invention mean that their vapor pressure at 25° C. does not change by more than 10% after half of the initial mixture has been allowed to evaporate. Thus, the compositions described herein resist component segregation which would seriously diminish their usefulness in the contemplated applications. The substantially constant boiling compositions are especially useful as refrigerants, heating applications, aerosol propellants, gaseous dielectrics, fire extinguishing agents, expansion agents for polyolefins and polyurethanes and as power cycle working fluids.

DETAILED DESCRIPTION OF PREFERRED EMBODIMENTS

The fluorinated compounds which comprise these mixtures are identified in the industry as FC-218 (perfluoropropane) and HFC-143a (1,1,1-trifluoroethane) respectively, in nomenclature conventional to the halocarbon field.

A phase study on various mixtures of perfluoropropane and 1,1,1-trifluoroethane containing widely different amounts of the fluorocarbons indicate that at constant temperature an azeotrope is formed over the temperature range studied. Further studies for the evaluation of substantially constant boiling compositions containing a wide range of proportions of the fluorocarbon components resulted in resistance to component fractionation of the mixture so that the compositions are substantially constant boiling at constant temperature. Utilizing the particular fluorocarbon components in the amounts described, quite unexpectedly, illustrate that at constant temperature of 25° C. the change in vapor pressure of the compositions even after 50% of the initial composition has been allowed to evaporate does not change by more than 10%. The small change in vapor pressure at constant temperature illustrates that the amount of separation and loss of one fluorocarbon component in excess amount that would substantially change the boiling temperature of the mixture does not occur, which makes the compositions suitable for the contemplated uses, especially as a refrigerant.

In addition, studies have further indicated that the novel substantially constant boiling compositions of the present invention exhibit dew and bubble points with small pressure differentials. As is well known in the art, the difference between dew point and bubble point pressures is an indication of the constant boiling or azeotrope-like behavior of mixtures. The pressure differentials demonstrated by the substantially constant boiling compositions of the present invention are very small, preferably less than about 5 psia, when compared with those of several known, nonazeotropic, binary compositions.

As is well recognized in this field of technology, there is a range of compositions which contain the same components as the true azeotrope, which not only will exhibit substantially equivalent properties as the true azeotrope for refrigerant and other applications, but which will also exhibit substantially equivalent properties to the true azeotropic composition in terms of constant boiling characteristics or tendency not to segregate or fractionate on boiling at other temperatures and pressures.

Additional fluorohydrocarbons can be added to the constant boiling mixture of FC-218 and HFC-143a without change the azeotrope-like properties of the composition. Representative fluorohydrocarbons that can be added to the constant boiling mixtures of the present invention include chlorodifluoromethane (HCFC-22), pentafluoroethane (HFC-125), 1,2,2,2-tetrafluoroethane (HFC-134a), 1,1,2,2-tetrafluoroethane (HFC-134), 1-chloro-1,1,2,2-tetrafluoroethane (HCFC-124a), 1-chloro-1,2,2,2-tetrafluoroethane (HCFC-124), 1,1,1,2,3,3,3-heptafluoropropane (HFC-227ea), 1,1,1,2,2,3,3-heptafluoropropane (HFC-227ca), difluoromethane (HFC-32), fluoromethane (HFC-41), trifluoromethane (HFC-23), 1,1-difluoroethane (HFC-152a) and fluoroethane (HFC-161).

Additives that are frequently incorporated in fluorocarbon compositions that can be added to the present compositions include lubricants, corrosion inhibitors, stabilizers and dyes.

In addition to refrigeration applications, the novel substantially constant boiling compositions of this invention are also useful as aerosol propellants, heat transfer media, gaseous dielectrics, fire extinguishing agents, expansion agents for polyolefins and polyurethanes and as power cycle working fluids.

The fluorocarbon compositions described herein can be used to produce refrigeration by condensing the constant boiling compositions and thereafter evaporating the compositions, e.e., condensate, in the vicinity of a body to be cooled. Further, these fluorocarbon compositions described herein can also be used to produce heat by condensing the constant boiling compositions in the vicinity of a body to be heated and thereafter evaporating the compositions.

The use of substantially constant boiling compositions of this invention eliminates the problem of component fractionation and handling in system operations because fluorocarbon compositions behave substantially as a single substance.

The fluorocarbon compositions of the present invention have zero ozone depletion potentials compared with Refrigerant 502, which has a 0.5 ozone depletion potential.

The following Examples further illustrate the invention wherein parts and percentages are by weight unless otherwise indicated.

EXAMPLE 1

Several mixtures of perfluoropropane and 1,1,1-trifluoroethane were distilled wherein the still pot composition was varied and the distillate vapor compositions and temperatures were measured at atmospheric pressure. A maximum vapor pressure azeotropic composition was identified as follows:

(a)

Perfluoropropane = 47.4 weight percent
1,1,1-Trifluoroethane = 52.6 weight percent
Vapor pressure = 760 torr at −49.7° C.

(b)

Perfluoropropane = 50.8 weight percent
1,1,1-Trifluoroethane = 49.2 weight percent
Vapor pressure = 5171.3 torr at 0° C.

(c)

Perfluoropropane = 52.6 weight percent
1,1,1-Trifluoroethane = 47.4 weight percent
Vapor pressure = 1833.5 torr at 50° C.

EXAMPLE 2

A phase study on constant boiling fluorocarbon compositions of perfluoropropane (FC-218) and 1,1,1-trifluoroethane (HFC-143a) to verifies minimal fractionation and change in pressure and composition during a vapor loss at 25° C. Initial liquid (IQ), final liquid (FQ), vapor composition (1), vapor pressure, and change in vapor pressure from the initial vapor pressure are shown below. The fluorocarbon composition containing FC-218 and HFC-143a is studied as shown in Table 1 to determine the effects of vapor leakage on the composition and the vapor pressure.

TABLE 1

| Sample | Percent Loss of Mixture | Composition (wt %) FC-218 | Composition (wt %) HFC-143a | Vapor Pressure (psia) | Vapor Pressure Change (%) |
|---|---|---|---|---|---|
| IQ | 0 | 65.0 | 35.0 | 198.5 | 0 |
| | 0 | 59.2 | 40.8 | 198.5 | 0 |
| 1 | 50 | 61.7 | 38.3 | 196.9 | 0.8 |
| FQ | 50 | 69.5 | 30.5 | 196.9 | 0.8 |

The data indicate that the mixture of perfluoropropane and 1,1,1-trifluoroethane is substantially constant boiling with only a 0.8% change in vapor pressure with 50% of the original mixture evaporated.

EXAMPLE 3

The difference between the dew point and the bubble point of the compositions of the present invention are very small when compared with known nonazeotropic compositions, namely (50+50) weight percent mixtures of pentafluoroethane (HFC-125) and 1,1,1,2-tetrafluoroethane (HFC-134a) and chlorodifluoromethane (HCFC-22) and 1-chloro-1,1-difluoroethane (HCFC-142b), respectively. The following data shown in Table 2 confirm the azeotropic behavior of the composition described herein.

TABLE 2

| Refrigerant Composition (Weight Percent) | Pressures (psia) at 25° C. Dew Point Pressure | Bubble Point Pressure | DP* |
|---|---|---|---|
| HFC-125 + HFC-134a (50 + 50) | 117.0 | 131.6 | 14.6 |
| HCFC-22 + HCFC-142b (50 + 50) | 73.4 | 97.5 | 24.1 |
| FC-218 + HFC-143a (1 + 99) | 181.0 | 181.3 | 0.3 |
| FC-218 + HFC-143a (5 + 95) | 182.5 | 184.0 | 1.5 |
| FC-218 + HFC-143a (15 + 85) | 186.7 | 190.0 | 3.3 |
| FC-218 + HFC-143a (25 + 75) | 191.2 | 194.6 | 3.4 |
| FC-218 + HFC-143a (35 + 65) | 195.6 | 197.9 | 2.3 |
| FC-218 + HFC-143a (43 + 57) | 198.6 | 199.5 | 0.9 |
| FC-218 + HFC-143a (45 + 65) | 199.2 | 199.8 | 0.6 |
| FC-218 + HFC-143a (55 + 45) | 199.9 | 200.1 | 0.2 |
| FC-218 + HFC-143a | 199.0 | 199.8 | 0.8 |

TABLE 2-continued

| Refrigerant Composition (Weight Percent) | Pressures (psia) at 25° C. | | |
|---|---|---|---|
| | Dew Point Pressure | Bubble Point Pressure | DP* |
| (58 + 42) | | | |
| FC-218 + HFC-143a | 194.1 | 198.5 | 4.4 |
| (65 + 35) | | | |
| FC-218 + HFC-143a | 179.7 | 194.1 | 14.4 |
| (75 + 25) | | | |

*DP is difference in pressure between the dew point and the bubble point pressures.

The difference in pressure between the dew point and bubble point is small. Compositions containing about 5-65 weight percent perfluoropropane exhibit a change in dew and bubble point pressures of less than 5 psia at 25° C. and those containing 43-58 weight percent perfluoropropane show a change in dew point and bubble point pressure of less than 1 psia at 25° C. This slight change in dew and bubble point pressure is minimal and, therefore, indicates that the compositions are constant boiling.

EXAMPLE 4

Evaluation of the refrigeration properties of the azeotropic mixture of Example 1(a), i.e., 47.4 weight percent perfluoropropane and 52.6 weight percent 1,1,1-trifluoroethane, and a fluorocarbon composition that is substantially constant boiling containing 25 weight percent perfluoropropane and 75 weight percent 1,1,1-trifluoroethane versus R-502 and HFC-125 is shown in Table 3.

TABLE 3

COMPARISON OF REFRIGERATION PERFORMANCES OF PERFLUOROPROPANE AND 1,1,1-TRIFLUOROETHANE

| | R-502 | HFC-125 | Weight Percentages of FC-218 and HFC-143a, Respectively | |
|---|---|---|---|---|
| | | | (47.4 + 52.6) | (25 + 75) |
| Evaporator Temp, °F. | −30.0 | −30.0 | −30.0 | −30.0 |
| Evaporator Pres, psia | 24.04 | 26.68 | 28.70 | 27.94 |
| Condenser Temp, °F. | 115.0 | 115.0 | 115.0 | 115.0 |
| Condenser Pres, psia | 281.9 | 327.5 | 322.6 | 320.4 |
| Return Gas Temp, °F. | 65.0 | 65.0 | 65.0 | 65.0 |
| Compressor Discharge, °F. | 238.0 | 223.1 | 238.9 | 272.6 |
| Coefficient of Performance | 1.89 | 1.69 | 1.66 | 1.71 |
| Capacity Btu/min | 80.01 | 79.41 | 81.36 | 85.50 |

Capacity means the change in enthalpy of the refrigerant in the evaporator per pound of refrigerant circulated, i.e., the heat removed by the refrigerant in the evaporator per time.

Coefficient of performance (C.O.P.) means the ratio of the capacity to the compressor work. It is a measure of refrigerant energy efficiency.

For a refrigeration cycle typified by the above conditions, both the C.O.P. and capacity in Btu/minutes increase by increasing the ratio of 1,1,1-trifluoroethane to perfluoropropane. The constant boiling fluorocarbon compositions of FC-218 and HFC-143a matches the performance of HFC-125 and R-502 with respect to condensing and evaporating pressures, discharge temperatures and capacity. From the above, it can be seen that the mixtures of perfluoropropane and 1,1,1-trifluoroethane offer substantially the same capacity, energy efficiency, and discharge temperature as HFC-125 alone.

I claim:

1. A substantially constant boiling composition consisting essentially of a binary mixture of 1-65 weight percent perfluoropropane and 35-99 weight percent 1,1,1-trifluoroethane wherein when the temperature is adjusted to 25° C., the composition has an initial vapor pressure of about 181-200 psia, and wherein the initial vapor pressure of the composition at 25° C. does not change by more than 10% after half the initial composition has been allowed to evaporate.

2. A substantially constant boiling composition of claim 1 which consists essentially of 43-58 weight percent perfluoropropane and 42-57 weight percent 1,1,1-trifluoroethane.

3. A substantially constant boiling composition of claim 1 which consists essentially of 46-54 weight percent perfluoropropane and 46-54 weight percent 1,1,1-trifluoroethane.

4. A substantially constant boiling composition of claim 1 which consists essentially of about 47.4 weight percent perfluoropropane and about 52.6 weight percent 1,1,1-trifluoroethane.

5. A substantially constant boiling composition of claim 4 having a boiling point of about −49.7° C. at 760 torr.

6. A process for producing refrigeration which comprises condensing the composition of claim 1 and thereafter evaporating said composition in the vicinity of a body to be cooled.

7. A process for producing heat which comprises condensing the composition of claim 1 in the vicinity of a body to be heated and thereafter evaporating said composition.

8. A process for producing refrigeration which comprises condensing the composition of claim 2 and thereafter evaporating said composition in the vicinity of a body to be cooled.

9. A process for producing heat which comprises condensing the composition of claim 2 in the vicinity of a body to be heated and thereafter evaporating said composition.

* * * * *